July 27, 1926.

E. B. FOOTE

MEASURING INSTRUMENT

Filed Oct. 3, 1924

INVENTOR.
Edward B. Foote
BY Frederick F. Church
his ATTORNEY

July 27, 1926.

E. B. FOOTE

MEASURING INSTRUMENT

Filed Oct. 3, 1924

INVENTOR.
Edward B. Foote
BY Frederick F. Church
his ATTORNEY

Patented July 27, 1926.

1,593,626

UNITED STATES PATENT OFFICE.

EDWARD B. FOOTE, OF ROCHESTER, NEW YORK, ASSIGNOR TO TAYLOR INSTRUMENT COMPANIES, OF ROCHESTER, NEW YORK, A CORPORATION OF NEW YORK.

MEASURING INSTRUMENT.

Application filed October 3, 1924. Serial No. 741,338.

This invention relates to electrical measuring instruments of the variety, for example, comprising an electric meter in circuit with a temperature sensitive element and with a balance resistance forming a Wheatstone bridge arrangement, for measuring temperatures, one object of the invention being to provide an improved combination and arrangement of parts affording a simple, compact and convenient construction for instruments of the above character. More specifically stated, it is an object of the invention to provide an advantageous form of construction for electrical measuring instruments in which adjustable parts may be conveniently positioned or set by the simple rotation of the rim of the instrument dial. A further object is the provision of such an instrument for indicating directly in terms of degrees of temperature.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

The preferred embodiment of the invention herein disclosed by way of illustration of the principles involved, comprises a casing in which is contained a galvanometer, a battery, and Wheatstone bridge connections and resistances including an adjustable resistance element for balancing the bridge and means for connection with an extension line including a temperature sensitive resistance to be subjected to the temperature to be measured, the effect of which on the resistance is indicated by the deflection of the galvanometer. The galvanometer dial is in the casing cover and is compactly provided with a rotatable rim for adjusting the balancing resistance and for simultaneously adjusting an indicating means marked directly in terms of temperature, so that when these parts are conveniently adjusted or set by rotating the dial rim to balance the bridge and restore the galvanometer index to zero, the temperature to be measured is indicated directly in degrees by the indicating means thus set.

Figure 2:
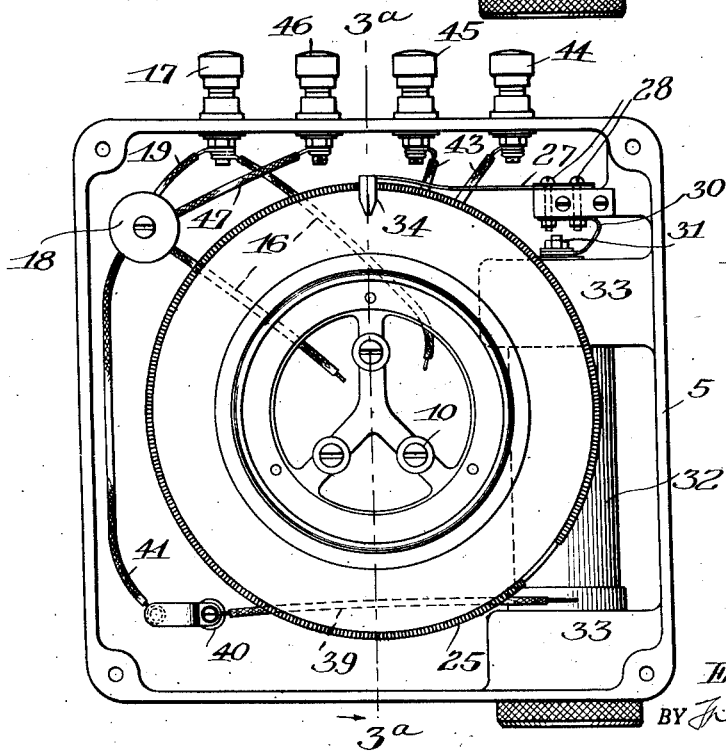
Figure 2 is a similar view with the casing cover and other portions removed.
Figure 3:
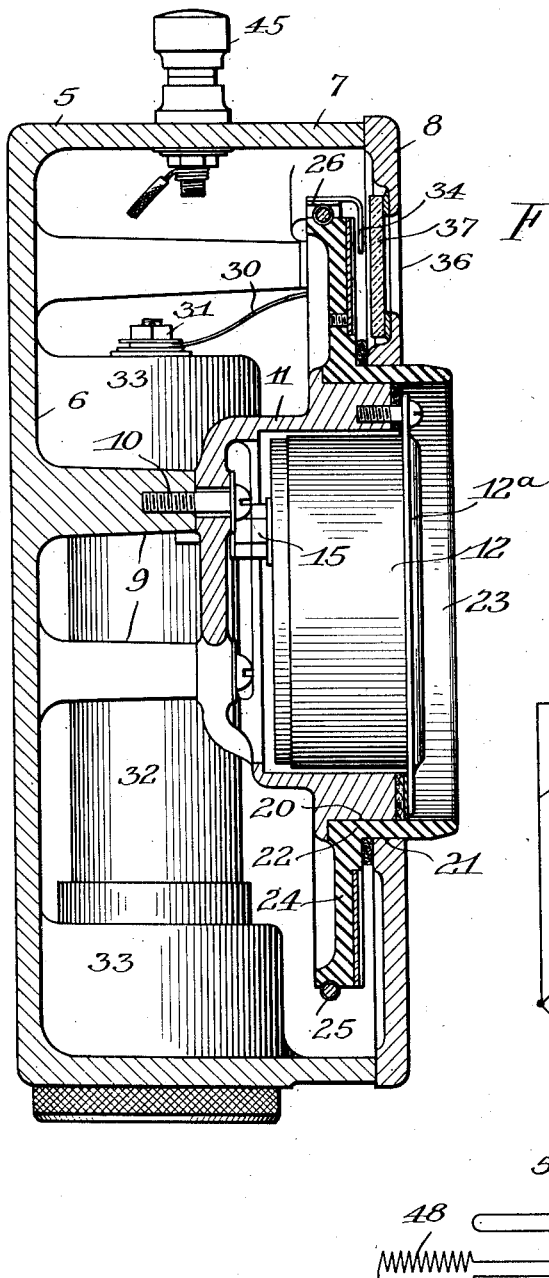
Figure 3 is an enlarged sectional view on the line 3ª—3ª in Figure 2.

Referring more particularly to the drawings, the casing is shown at 5 as having a back wall 6 and sides 7 on the front of which a cover plate 8 is secured as by means of screws 9. Projecting forwardly in the casing from the rear wall 6 are supporting abutments 9, Figure 3, to which is attached as by means of screws 10 a galvanometer receptacle 11. The latter has its open forward side projecting through an opening in the cover 8 substantially flushed with the forward side of the latter. A galvanometer or similar meter 12 of the usual or any suitable construction has the flange 12ª about its dial 13 and index 13ª secured as by means of screws 14 to the receptacle 11 in which the galvanometer is thus housed. The galvanometer binding posts indicated generally at 15, Figure 3, are connected as by means of leads 16, Figure 2, with a binding post 17 and with a resistance coil 18, respectively, the binding post being also connected by a lead 19 with the coil 18 hereafter described.

Rotatably supported between the outer wall 20 of the galvanometer receptacle 11 and the periphery 21 of the galvanometer opening in the casing cover 8 is an annular member 22 having a forwardly extending portion or flange 23 forming a rim about the galvanometer dial as shown. Flange 23 projects sufficiently and is so designed as to provide an easily manipulated rotatable rim for adjusting or setting the instrument in accordance with the reading of the galvanometer to indicate the temperature as hereafter described.

Annular member 22 has also a radially extending portion 24 on the periphery of which is carried, preferably in a circular groove as shown, a suitable resistance element in the present instance in the form of a coil or resistance wire arranged in a circle about the portion 24. The latter and in fact the entire member 22 including its adjusting rim 23 are preferably constructed from a suitable insulating material such, for example, as hard rubber, but of course this member may be variously constructed, it being apparent that the resistance element 25 is adjusted or rotated by rotation of the setting rim 23.

Figure 1:
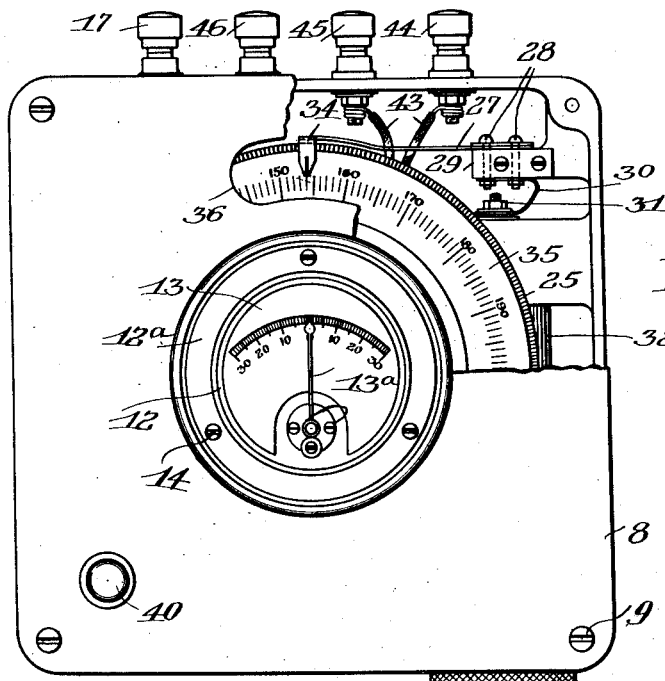
Figure 1 is a face view of an instrument embodying the present invention, with a part of the casing broken away.

Contacting with resistance element 25 is a brush 26 on a conducting strip 27 secured as by means of screws 28 to a lug 29 on the casing side, these parts being preferably insulated from the casing in any suitable manner. Screws 28 have their other ends connected as by means of a conducting strip 30 with one terminal 31 of a source of power such as a battery 32 of any suitable variety supported in the casing between lugs 33 thereof as shown. Brush strip 27 preferably carries also an index 34 extending over the edge of the flange portion 24 of member 22 on the forward side of which is a circular scale 35, Figure 1, the graduations of which are marked in terms of a suitable temperature range. Scale 35 and its cooperating index 34 form a temperature indicating means visible through an opening 36 in the casing cover adjacent the galvanometer dial, the opening being preferably provided with a transparent closure or crystal 37 as shown. It will be seen that by rotating the setting rim 23, the resistance element 25 is adjusted or rotated in contact with its brush 27 to vary the amount of resistance included in the circuit and that the temperature scale 35 is simultaneously adjusted or set to effect an indication corresponding to the position of adjustment of the resistance element 25.

Referring more especially to the electrical connections employed, the coil 18 is preferably wound with wire to afford two fixed resistances 38 of a Wheatstone bridge, the balancing resistance of which is formed by the adjustable element 25 already described and connected by the brush or contact 26 with one terminal of the battery 32. The other terminal of the latter is connected by means of a lead 39, Figure 2, with a push button switch of any suitable construction indicated generally at 40, the other terminal of which switch is connected by a lead 41 with the junction of the resistances 38 in coil 18. The other or outer terminals of these resistances are connected by leads 16 with the galvanometer as described above. The terminals of the balancing resistance 25 are connected in any suitable manner as by means of flexible leads 43 with binding posts 44 and 45, respectively, in the casing wall. A fourth binding post 46 on the casing is connected by means of a lead 47 with the outer terminal of the resistances 38 opposite the terminal previously described as connected by the lead 19 with binding post 17.

Figure 4:
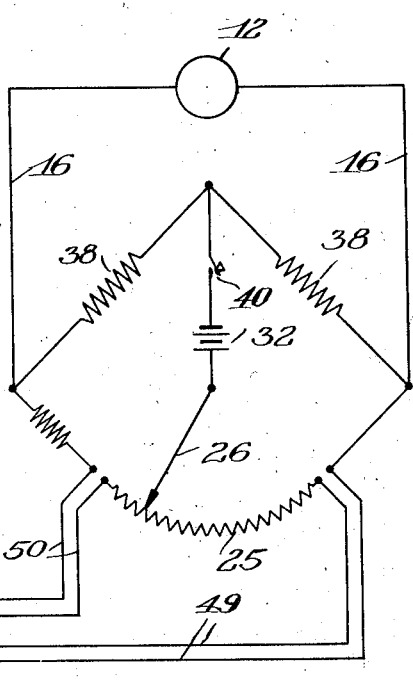
Figure 4 is a diagrammatic view showing the electrical connections.

As apparent from the above description, the present instrument is of the form in which the galvanometer circuit is energized by a source of power, such as the battery 32, and includes a resistance element, indicated diagrammatically at 48, Figure 4, constructed of a material the resistance of which varies in proportion to the temperature to which it is subjected, so that the galvanometer deflection is proportional to the temperature in which the element 48 is located for measuring the latter, as well understood in the art. Element 48 is in the present instance incorporated in an exploring bulb connected by flexible extension leads 49 with binding posts of the instrument, as posts 17 and 44. An additional pair of leads 50 is provided in the present instance and arranged coextensive with leads 49, preferably in the same conduit or insulating cover with the latter, to provide compensation for temperature effects on the leads 49, as well understood in the art. Compensating leads 50 thus form a circuit, the ends of which are connected in series with resistance 25 in opposed relation to the bulb leads 49, as, for example, to the binding posts 45 and 46 on the casing.

It is apparent from the above description of the apparatus that the subjection of the thermometer bulb resistance 48 to a temperature to be observed produces a corresponding deflection of the galvanometer 12 and that the latter may be brought to zero by a corresponding adjustment of the rotary balancing resistance 25 by the rotation of the galvanometer dial rim 23. The rotary adjustment of this resistance thus corresponds to the temperature to be measured and such adjustment and the temperature to be measured are clearly indicated directly in degrees of temperature by the index 34 and cooperating scale 35.

The invention thus provides a simple, compact and advantageous combination and arrangement of parts in which the adjustment to effect the desired measurement is accomplished by the simple rotation of the rim of the galvanometer dial and affords an indication of the temperature to be measured directly in temperature degrees and with the scales or dials to be observed and the adjusting means therefor located in convenient proximity on the casing cover.

I claim as my invention—

1. In an electrical instrument, the combination of an indicator comprising a dial, a second indicator, and a movable rim for said dial having a connection with said second indicator to set the latter.

2. In an electrical instrument, the combination of an indicator comprising a dial, adjustable resistance means, and a movable rim for said dial connected with said resistance means for adjusting the same.

3. In an electrical instrument, the combination of an indicator comprising a dial, adjustable resistance means provided with a second indicator, and a rotatable annular member about said dial connected with said resistance means and said second indicator to adjust the same.

4. In a temperature measuring instrument including a galvanometer and a resistance variable as a function of temperature, the combination with the galvanometer, of a rim mounted for angular movement about the galvanometer and means for variably affecting the indications of the galvanometer in proportion to the angular movement of the rim.

5. In a temperature measuring instrument including a galvanometer and a resistance variable as a function of temperature, the combination with the galvanometer, of a rim mounted for angular movement about the galvanometer, a scale and an index therefor, mounted for relative movement, one being carried by the said rim and means for variably affecting the indications of the galvanometer in proportion to the angular movement of the rim.

6. In a temperature measuring instrument including a galvanometer and a resistance variable as a function of temperature, the combination with the galvanometer, of a rim mounted for angular movement about the galvanometer, a scale mounted for movement with the rim, a stationary index for the scale and means for variably affecting the indications of the galvanometer in proportion to the angular movement of the rim.

7. In a temperature measuring instrument including a galvanometer and a resistance variable as a function of temperature, the combination with the galvanometer, of a rim mounted for angular movement about the galvanometer, means including a resistance element extending peripherally of the rim for varying the indications of the galvanometer and means for indicating the extent of angular movement of the rim.

EDWARD B. FOOTE.